United States Patent
Huber et al.

(10) Patent No.: US 7,578,879 B2
(45) Date of Patent: Aug. 25, 2009

(54) EFFECT PIGMENTS THAT ARE SURFACE-MODIFIED WITH LCST AND/OR UCST POLYMERS

(75) Inventors: Adalbert Huber, Bensheim (DE); Marc Entenmann, Fellbach (DE); Thadeus Schauer, Althengstett (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/527,980

(22) PCT Filed: Sep. 4, 2003

(86) PCT No.: PCT/EP03/09801

§ 371 (c)(1),
(2), (4) Date: Mar. 15, 2005

(87) PCT Pub. No.: WO2004/029160

PCT Pub. Date: Apr. 8, 2004

(65) Prior Publication Data

US 2006/0046057 A1 Mar. 2, 2006

(30) Foreign Application Priority Data

Sep. 18, 2002 (DE) ................. 102 43 438

(51) Int. Cl.
C09C 1/00 (2006.01)
C09C 1/04 (2006.01)
C09C 1/14 (2006.01)
C04B 14/00 (2006.01)
C04B 14/04 (2006.01)
C08K 5/00 (2006.01)

(52) U.S. Cl. .................. 106/415; 106/418; 106/430; 106/435; 106/481; 106/499

(58) Field of Classification Search ............... 106/415, 106/418, 430, 435, 481, 499, 436
See application file for complete search history.

(56) References Cited

U.S. PATENT DOCUMENTS

| | | | | |
|---|---|---|---|---|
| 3,884,871 A | * | 5/1975 | Herman et al. | 523/202 |
| 5,563,242 A | * | 10/1996 | Winter et al. | 524/91 |
| 6,133,047 A | * | 10/2000 | Elaissari et al. | 436/526 |
| 6,176,918 B1 | * | 1/2001 | Glausch et al. | 106/415 |
| 6,478,863 B2 | * | 11/2002 | Johnson et al. | 106/31.6 |
| 6,686,046 B2 | * | 2/2004 | Schauer et al. | 428/403 |
| 6,858,072 B1 | * | 2/2005 | Li et al. | 106/415 |
| 7,026,051 B2 | * | 4/2006 | Schauer et al. | 428/403 |
| 7,318,862 B2 | * | 1/2008 | Carsten et al. | 106/479 |
| 2003/0012954 A1 | | 1/2003 | Schauer et al. | |
| 2005/0252417 A1 | * | 11/2005 | Carsten et al. | 106/415 |
| 2006/0155007 A1 | * | 7/2006 | Huber | 523/205 |
| 2006/0155077 A1 | * | 7/2006 | Galimberti et al. | 525/332.5 |
| 2007/0166534 A1 | * | 7/2007 | Entenmann et al. | 428/336 |
| 2007/0166544 A1 | * | 7/2007 | Hennemann et al. | 428/405 |
| 2008/0249210 A1 | * | 10/2008 | Entenmann et al. | 523/205 |

FOREIGN PATENT DOCUMENTS

| | | |
|---|---|---|
| WO | WO 0160926 | 8/2001 |
| WO | WO 0192359 | 12/2001 |
| WO | WO 03014229 | 2/2003 |

* cited by examiner

*Primary Examiner*—Patricia L Hailey
(74) *Attorney, Agent, or Firm*—Millen, White, Zelano & Branigan, P.C.

(57) ABSTRACT

The present invention relates to surface-modified effect pigments based on flake-form substrates which are distinguished by the fact that they are sheathed with one or more layers of immobilized LCST and/or UCST polymers. The invention furthermore relates to a process for the production of the surface-modified effect pigments and to the use thereof in surface coatings, water-borne coatings, powder coatings, paints, printing inks, security printing inks, plastics, concrete, in cosmetic formulations, in agricultural sheeting and tarpaulins, for the laser marking of papers and plastics, as light protection, as pigment for corrosion protection and for the preparation of pigment compositions and dry preparations.

20 Claims, No Drawings

EFFECT PIGMENTS THAT ARE SURFACE-MODIFIED WITH LCST AND/OR UCST POLYMERS

The present invention relates to surface-modified effect pigments based on flake-form substrates which are distinguished by the fact that they are sheathed with one or more layers of immobilised LCST and/or UCST polymers.

The ever increasing usability of flake-form effect pigments based on flake-form substrates in various industrial areas increasingly requires the development of surface-modified substrates in order ultimately to guarantee the compatibility of the pigments with further components within industrial compositions.

A fundamental problem here is the tendency of flake-form effect pigments to form agglomerates in which the pigments are in the form of a stack on one another and can only be separated again with difficulty owing to strong adhesion. This is all the more serious as high shear forces must not be exerted during incorporation of flake-form effect pigments into application media owing to the high fragility of the thin flakes.

Structure formations or flocculation, agglomeration and aggregation are in particular undesired processes in the area of surface finishes.

Thus, inter alia, numerous methods have been developed for solving the problem of incorporation of flake-form pearlescent pigments, in particular into thermoplastics (DE-A 26 03 211, DE-A 32 21 044, DE-A 36 27 329).

Furthermore, coatings comprising polysiloxanes for improving weathering resistance are known (DE 33 34 598) and the treatment with coupling reagents, such as organotitanates, for improved dispersibility in cosmetic preparations (EP 0 306 056), organosilanes for increased water resistance and with silanes for increasing the leafing behaviour (EP 0 634 459 A2).

The surface-modified pearlescent pigments known from the prior art frequently have the disadvantage that their orientation in application media is not optimal, i.e. an improvement in the parallel alignment of the pigment to the film layer would be desirable in order to improve the lustre properties.

The object of the present invention is to develop further and improved processes for the surface modification of effect pigments based on flake-form pigments. A further aim is to optimise the parallel alignment of the pigments in the film layer in order to improve the optical properties, in particular the lustre. In particular, the effect pigments should be compatible for a very wide variety of industrial formulations without at the same time losing the typical properties of the effect pigments.

WO 01/60926 describes the coating of flakes with LCST polymers, causing the pigments to be stabilised in liquid media, such as, for example, paints, and at the same time causing the coating to offer protection against mechanical damage under shear stresses.

Surprisingly, it has now been found that, in particular, surface-coating layers which comprise effect pigments based on flake-form particles which are coating with one or more LCST and/or UCST polymers have a greatly improved appearance.

The invention therefore relates to surface-modified effect pigments based on flake-form substrates which are sheathed with one or more layers of immobilised LCST and/or UCST polymers.

The post-coating of the effect pigments with LCST and/or UCST polymers substantially minimises or even completely suppresses the problems of flocculation, agglomeration and aggregation, in particular in paints, such as automotive paints, industrial coatings and powder coatings.

The invention furthermore relates to the production of the surface-modified effect pigments and to the use thereof, inter alia, in surface coatings, water-borne coatings, powder coatings, paints, printing inks, security printing inks, plastics, concrete, as pigment for corrosion protection, as dopant for the laser marking of paper and plastics and in cosmetic formulations. The effect pigments according to the invention are furthermore also suitable for the preparation of pigment compositions and for the preparation of dry preparations.

The effect pigments used are preferably commercially available metal-effect pigments, such as, for example, ChromaFlair pigments from Flex, coated or uncoated aluminium flakes, gold-bronze pigments, for example from Eckart, coated iron oxide flakes, such as, for example, Paliochrom® pigments from BASF, Sicopearl pigments from BASF and goniochromatic pigments from BASF, as described, for example, in EP 0 753 545 A2, as well as pearlescent pigments and interference pigments—metal oxide-coated mica flake pigments—obtainable, for example, from Merck, Darmstadt, under the trade name Iriodin®. The latter are disclosed, for example, in German patents and patent applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602, 32 35 017, DE 38 42 330, DE 41 37 764, EP 0 608 388, DE 196 14 637, DE 196 18 569. Preference is given to the use of pearlescent pigments. In particular, use is made as substrate of natural or synthetic mica, $SiO_2$ flakes, $Al_2O_3$ flakes, glass flakes, ceramic flakes or synthetic support-free flakes coated with $TiO_2$ and/or $Fe_2O_3$.

Particularly preferred effect pigments are holographic pigments, conductive and magnetic pigments, metal-effect pigments, for example based on aluminium flakes and/or iron flakes, and effect pigments, such as, for example, pearlescent pigments, interference pigments, goniochromatic pigments and multilayered pigments.

The flake-form substrates are preferably natural or synthetic mica, BiOCl flakes, $Al_2O_3$ flakes, $TiO_2$ flakes, $SiO_2$ flakes, $Fe_2O_3$ flakes, glass flakes or graphite flakes. Preferred effect pigments are substrates coated with $TiO_2$ (rutile or anatase), such as, for example, $TiO_2$-coated natural or synthetic mica, $TiO_2$-coated $SiO_2$, $Al_2O_3$, graphite, glass, $Fe_2O_3$ or metal flakes, in particular aluminium flakes. Preference is furthermore given to multi-layered pigments having two, three or more layers comprising one or more $TiO_2$ layers.

Particularly preferred effect pigments are mentioned below, substrate+$TiO_2$
substrate+$Fe_2O_3$
substrate+$Fe_3O_4$
substrate+$Cr_2O_3$
substrate+titanium suboxides
substrate+$TiO_2$+$Fe_2O_3$
substrate+$TiO_2$+$SiO_2$+$TiO_2$
substrate+$TiO_2$$Fe_2O_3$+$SiO_2$+$TiO_2$
substrate+$TiO_2$/$Fe_2O_3$+$SiO_2$+$TiO_2$/$Fe_2O_3$
substrate+$TiO_2$+$SiO_2$+$TiO_2$/$Fe_2O_3$
substrate+$Fe_2O_3$+$TiO_2$+$SiO_2$+$TiO_2$ where the substrate preferably comprises mica, $Al_2O_3$ flakes, $SiO_2$ flakes, or metal flakes and metal-coated inorganic flakes.

It is also possible to stabilise mixtures of different effect pigments by the process according to the invention.

The particles according to the invention can be produced relatively easily. The surface modification of the effect pigments is carried out by prior or simultaneous precipitation of a suitable LCST and/or UCST polymer followed by immobilisation.

LCST polymers and UCST polymers are polymers which are soluble in a solvent at low and elevated temperatures respectively and are deposited from the solution as a separate phase on increasing and reducing the temperature respectively and reaching the so-called LCST and UCST (lower and upper critical solution temperature) respectively. Polymers of this type are described, for example, in the literature in "Polymere" [Polymers], H.-G. Elias, Hüthig and Wepf-Verlag, Zug, 1996, on pages 183 ff.

Suitable LCST polymers and UCST polymers for the present invention are, for example, those as described in WO 01/60926 A1 and WO 03/014229 A1.

Particularly suitable LCST polymers are polyalkylene oxide derivatives, preferably polyethylene oxide (PEO) derivatives, polypropylene oxide (PPO) derivatives, olefinically modified PPO-PEO block co-polymers, acrylate-modified PEO-PPO-PEO three-block copolymers, polymethyl vinyl ether, poly-N-vinylcaprolactam, ethyl(hydroxyethyl) cellulose, poly(N-iso-propylacrylamide) and polysiloxanes. Particularly preferred LCST polymers are siloxane polymers modified with olefinic groups.

Suitable UCST polymers are, in particular, polystyrene, polystyrene co-polymers and polyethylene oxide co-polymers.

Preference is given to the use of LCST or UCST polymers containing functional groups which undergo strong interactions and/or form chemical bonds with the effect pigment and the application medium, such as, for example, the coating matrix. All functional groups known to the person skilled in the art are suitable, in particular silanol, amino, hydroxyl, epoxide, acid anhydride and acid groups.

The LCST and UCST polymers preferably have molecular weights in the range from 300 to 500,000 g/mol, in particular from 500 to 20,000 g/mol.

The polymer content, based on the end product, is 0.1-80% by weight, preferably 1-30% by weight, in particular 1-20% by weight.

The effect pigment is preferably mixed with an immobilisable LCST and/or UCST polymer or polymer mixture, if necessary in the presence of a solvent. The LCST polymer is dissolved at a temperature below the LCST, while the UCST polymer is dissolved above the UCST. In general, the LCST temperature is 0.5-90° C., preferably 35-80° C., while the UCST temperature is 5-90° C., in particular 35-60° C. If desired, additives are then added. The temperature is subsequently generally increased by about 5° C. above the LCST or lowered by about 5° C. below the UCST, whereupon the polymer precipitates and deposits on the particle surface. Finally, the immobilisation is carried out in the form of crosslinking of the polymer on the particle surface, with the polymer being irreversibly immobilised on the particle surface. The immobilisation can be carried out, for example, by means of free radicals, cationically, anionically or by a condensation reaction. The LCST or UCST polymers are preferably cross-linked by means of free radicals or by a condensation reaction.

For free-radical crosslinking (immobilisation) of the deposited layer in water, use is preferably made of potassium peroxodisulfate or ammonium peroxodisulfate in concentration ranges of 1-100% by weight, based on the olefinic LCST or UCST polymer used for the coating. The crosslinking is carried out, depending on the LCST or UCST temperature of the polymer, at 0-35° C. using a catalyst, such as, for example, an Fe(II) salt, or at 40-100° C. by direct thermal decomposition of the free-radical initiator.

If a solvent is required in the process according to the invention, the choice of solvent depends on the solubility of the polymer used. The solvent is preferably water or a water-miscible organic solvent. Water-miscible solvents also include solvents which have miscibility gaps with water. In these cases, the mixing ratios are selected in such a way that miscibility occurs. Examples of suitable solvents are mono- and polyalcohols, such as, for example, methanol, ethanol, n-propanol, isopropanol, cyclohexanol, glycol, glycerol, propylene glycol, polyethylene glycol, polybutylene glycol and the mono-and diethers of polyalkylene glycols with methanol, ethanol, propanol and butanol; ethers, such as, for example, tetrahydrofuran, dioxane, 1,2-propanediol propyl ether, 1,2-butane 1-methyl ether, ethylene glycol monomethyl ether, diethylene glycol monomethyl ether; esters, such as, for example, methyl acetate, monoesters of ethylene glycol or propylene glycols with acetic acid, butyrolactone; ketones, such as acetone or methyl ethyl ketone; amides, such as formamide, dimethylformamide, dimethylacetamide, N-methylpyrrolidone and hexamethylphosphoric triamide; sulfoxides and sulfones, such as dimethyl sulfoxide and sulfolane; alkanecarboxylic acid, such as formic acid or acetic acid.

The LCST and/or UCST polymer coatings are preferably carried out as complete sheathing of the particles. Particular preference is given to effect pigments that have an LCST polymer sheath, in particular of polysiloxanes, or an alternating LCST and UCST polymer sheath. The effect pigments can also be sheathed with two or more successive, in each case identical or different LCST or UCST polymers. The effect pigments preferably contain not more than five polymer sheaths.

The polymer layer thickness determines, inter alia, the deposition behaviour, the so-called seeding, of the effect pigments. The seeding can be suppressed by selecting the polymer sheath to be correspondingly thick, so that the density of the pigments is influenced. The particles are deposited more slowly and usually are not compacted to the same extent as untreated effect pigments, so that they can easily be stirred up again. The polymer sheath likewise substantially suppresses bleeding of the pigments in the application medium.

Polymer layers of 2-500 nm, preferably 10-200 nm and in particular 20-80 nm, have proven particularly preferred.

The individual LCST and/or UCST polymer layers may also comprise additives which additionally increase or reduce the chemical and/or mechanical stability of the effect pigments.

Suitable additives are, for example, nanoparticles, such as, for example, barium sulfate, polymerisable monomers, plasticisers, antioxidants, carbon-black particles, microtitanium or mixtures thereof.

The proportion of additives is preferably 0.001 to 150% by weight, in particular 0.05 to 100% by weight, based on the polymer employed.

The additives are preferably admixed with the solution of the LCST or UCST polymer in the form of a dispersion, preferably using the same solvent as that of the polymer solution, and the temperature of the dispersion is reduced below the LCST or UCST. However, direct dispersal of the additives in the LCST or UCST solution can also be carried out.

The surface modification of the effect pigments with an LCST and/or UCST polymer modifies the physical parameters of the pigments, such as, for example, the refractive index. Furthermore, the hydrophilicity or hydrophobicity and thus also the surface tension and the interfacial tension of the effect pigments in various application media can also be set in a targeted manner by means of a suitable polymer coating. This results in improved and faster wetting and improved compatibility of the effect pigments with the respective systems. Since the LCST and/or UCST polymer layer is furthermore also able to absorb mechanical stresses, the post-treated effect pigments are also more stable to shear stresses. This is advantageous in particular in corresponding applications of shear-sensitive effect pigments, such as, for example, aluminium pigments and mica-based effect pigments. In the case of metal pigments, the surface modification simultaneously serves as corrosion protection.

In highly crosslinked LCST and UCST polymer coatings, bleeding and blooming of the effect pigments in the application system is furthermore greatly suppressed.

The inclusion of foreign substances, such as, for example, nanoparticles, plasticisers and polymerisable monomers, enables the properties of the polymer layer, such as hardness and degree of crosslinking (reversibility) of the layer, additionally to be influenced. Thus, it is possible, for example, to deposit titanium dioxide nanoparticles with crosslinkable LCST polymer and further monomers as a mixture by precipitation, it being possible to vary the hardness, crosslinking density and hydrophilicity/hydrophobicity depending on the polymer mixture. This mixture is then crosslinked on the surface, it being possible additionally to influence the properties of the deposited polymer layer depending on the crosslinking reaction and amount of crosslinking agent.

If LCST polymers modified with acrylate groups are crosslinked on the surface with, for example, potassium peroxodisulfate, the hydrophilicity of the effect pigment is greatly increased not only by the polymer sheath, but also by the amount of peroxodisulfate employed.

The effect pigments according to the invention preferably have an isoelectric point (pH at which the zeta potential of the pigment becomes zero) in the range from 5 to 10, in particular from 6 to 8, using the ESA (electroacoustic spectral analysis) method.

The surface-modified effect pigments furthermore exhibit very good weathering resistance, very good dispersion behaviour and, owing to their stability, are very highly suitable for a very wide variety of application systems, in particular for water-borne and organic surface coatings, particularly preferably for powder coatings.

Effect pigments based on flake-form substrates are generally shear-sensitive. The surface modification of the effect pigments with LCST and/or UCST polymers results in additional mechanical stabilisation of the pigments at high shear stresses or in abrasive processing methods. The stabilisation can additionally be increased if nanoparticles are additionally admixed with the LCST and/or UCST polymers. Effect pigments stabilised in this way can be subjected to significantly higher shear forces than the untreated effect pigments without loss of the flake structure.

The effect pigments according to the invention exhibit improved orientation and greatly improved colour values in the surface coating compared with pearlescent pigments which have been treated with a silane in order to improve the leafing behaviour (EP 0 634 459 A2).

The effect pigments modified in accordance with the invention are compatible with a multiplicity of colour systems, preferably from the area of surface coatings, water-borne coatings, powder coatings, paints, printing inks, security printing inks, plastics and cosmetic formulations. The particles according to the invention, if they have been correspondingly functionalised by the polymer post-treatment, are furthermore suitable as functional pigments, inter alia for the laser marking of papers and plastics, as light protection, as pigment for corrosion protection, for the colouring of concrete and for applications in the agricultural sector, for example for greenhouse sheeting, and also, for example, for the colouring of tarpaulins.

It goes without saying that the particles according to the invention can advantageously also be used for the various applications in the form of a blend with organic dyes, organic pigments or other pigments, such as, for example, transparent and opaque white, coloured and black pigments, and with flake-form iron oxides, organic pigments, holographic pigments, LCPs (liquid crystal polymers), and conventional transparent, coloured and black lustre pigments based on metal-oxide-coated mica, glass, $Al_2O_3$, graphite and $SiO_2$ flakes, etc. The particles stabilised in accordance with the invention can be mixed with commercially available pigments and fillers in any ratio.

The surface-modified effect pigments are furthermore suitable for the production of flowable pigment compositions and dry preparations, such as, for example, granules, chips, briquettes, sausages, pellets, etc. The pigment compositions and dry preparations are distinguished by the fact that they comprise at least one or more effect pigments according to the invention, binders and optionally one or more additives. The dry preparations need not be completely dried here, but instead may comprise up to a max. of 8% by weight, preferably 3-6% by weight, of water and/or a solvent or solvent mixture.

The invention thus also relates to formulations which comprise the pigment compositions and dry preparations according to the invention.

The following examples are intended to explain the invention in greater detail, but without limiting it.

EXAMPLES

Example 1

5 g of a siloxane-LCST polymer modified with olefinic groups are dissolved in 300 g of water at 5° C., 100 g of Iriodin® 504 (iron(III) oxide-coated mica pigment from Merck KGaA) are dispersed in, and the mixture is stirred for 0.5 h at 500 rpm in order to wet the pigment. The mixture is then warmed to the LCST of the polymer of 8° C., the temperature is held for 20 min, the mixture is warmed to 20° C., and the precipitated polymer layer for the duration of 2 h the polymer layer is immobilised by means of free radicals by a hydrophilic, water-soluble crosslinking agent (potassium peroxodisulfate). The product is filtered off and washed with water.

If this surface-modified effect pigment is incorporated into a conventional acrylic paint, it exhibits a DOI value which is increased by 8% compared with an untreated Iriodin® 504 pigment and a DOI value (distinctness of image, Dorigon, Hunter Lab) which is increased by 5% compared with a silane-treated Iriodin® 504 pigment.

The DOI value is a measure of the brightness and imaging sharpness of a surface-coating layer, with a relatively high DOI value being characteristic of improved brightness and imaging sharpness.

Example 2

2.4 g of a polyether-based LCST polymer modified with olefinic groups and amino groups are dissolved in 600 ml of water at 20° C., and 200 g of Iriodin® 504 are added. The mixture is stirred at 20° C. for 0.5 h and then warmed to the LCST temperature of 62° C. After stirring at 62° C. for 0.5 h, 5 g of a hydrophilic water-soluble crosslinking agent (potassium peroxodisulfate) are added, the temperature is increased to 72° C. and held at 72° C. for the duration of 2 h. The modified pigment is filtered off and washed with water.

An isoelectric point (pH at which the zeta potential of the pigment becomes zero) of 5.4 is determined in the surface-modified effect pigment using the ESA (electroacoustic spectral analysis) method.

If the treated pearlescent pigment is crosslinked under identical conditions with only 1 g of the hydrophilic water-soluble free-radical crosslinking agent, an isoelectric point of the pigment of 7.8 results. If the coated pearlescent pigment is not crosslinked, an isoelectric point of 8.7 is obtained.

These differences in the isoelectric point result, inter alia, due to the different degree of addition of hydroxyl free radicals onto the olefinic double bond. The post-treatments immobilised with different amounts of crosslinking agent accordingly have a different density of hydroxyl groups, which results in a considerably modified charge behaviour and also a modified hydrophilicity of the post-treated effect pigment.

Example 3

1.5 g of a polystyrene-based UCST polymer modified with olefinic groups are dissolved in 60 g of cyclohexanol at 85° C., 10 g of aluminium flakes (Eckart) are added, and the mixture is stirred at 500 rpm for 0.5 h in order to wet the pigment. The mixture is then cooled to the UCST of the polymer of 65° C., the temperature is held for 20 min, and the precipitated polymer layer for the duration of 2 h the polymer layer is immobilised at 65° C. by means of free radicals by a hydrophobic crosslinking agent (azoisobutyronitrile). The product is filtered off and washed with acetone.

If this surface-modified metal-effect pigment is incorporated into a conventional acrylic paint, it exhibits a DOI value which is increased by 5% compared with the untreated pigment. The post-coated aluminium pigment furthermore proves to be gassing-stable in aqueous solution in the pH range 3-9.

Example 4

15 g of a polyethylene glycol-polypropylene glycol block copolymer modified with olefinic groups are dispersed with 3 g of barium sulfate nanoparticles for the duration of one hour using dispersion beads in the Scandex. This mixture is added to 200 g of water at room temperature, 200 g of BiOCl paste (50% in water, Merck KGaA) are stirred in and warmed to the LCST temperature of 55° C. After stirring for 0.5 h, the mixture is warmed to 65° C., 3 g of potassium peroxodisulfate are added, and the mixture is crosslinked for the duration of 2 h. The coated BiOCl pigments are centrifuged off and rinsed with water.

The product is diluted with water so that the solids content is about 50%. After shearing for 1 h at 3000 rpm in the Dispermat and using a 5 cm toothed disc, the particle size is measured and compared with uncoated BiOCl pigments which have been stressed analogously. The particle size of the uncoated BiOCl pigments is about 22% lower than for the surface-modified BiOCl pigments.

The invention claimed is:

1. Surface-modified effect pigments based on flake-form substrates,
   which are sheathed with one or more layers of immobilised UCST polymer having layer Thicknesses of 2-500 nm,
   wherein the UCST polymer is a polystyrene, polystyrene copolymer or polyethylene oxide copolymer, or a mixture thereof,
   wherein said surface-modified effect pigments based on flake-form substrates are holographic pigments, pearlescent pigments, interference pigments, multilayered pigments, metal-effect pigments, goniochromatic pigments and/or BiOCl pigments,
   which surface-modified effect pigments are prepared by applying the UCST polymer to the surface of the effect pigments by precipitation in water and/or an organic solvent, and
   irreversibly immobilizing said UCST polymer on the surface of the effect pigments.

2. Surface-modified effect pigments according to claim 1, wherein the polymer sheath additionally comprises one or more nanoparticles, polymerizable monomers, plasticizers, antioxidants, carbon-black particles, microtitanium or a mixture thereof.

3. Surface-modified effect pigments according to claim 1, wherein the polymer sheath comprises 0.001 to 150% by weight of one or more additives, based on the polymer.

4. Surface-modified effect pigments according to claim 1, wherein the effect pigments are based on natural or synthetic mica, $Al_2O_3$ flakes, $TiO_2$ flakes, $SiO_2$ flakes, $Fe_2O_3$ flakes, glass flakes, ceramic flakes or graphite flakes.

5. Surface-modified effect pigments according to claim 1, wherein one or more additives are added to the polymer.

6. Surface-modified effect pigments according to claim 1, wherein the precipitation is achieved by
   dissolving the UCST polymer in the water and/or organic solvent at a temperature above the upper critical solution temperature to obtain a solution,
   mixing the effect pigments with the solution to obtain a mixture,
   lowering the temperature of the mixture to or below the lower critical solution temperature, whereby the UCST polymer deposits onto the surface of the effect pigments.

7. Surface-modified effect pigments according to claim 1, where the immobilization of the UCST polymer on the surface of the pigment is achieved by the cross-linking of the polymer.

8. Surface-modified effect pigments according to claim 1, wherein the polymer sheath has layer thicknesses of 2-10 nm.

9. A surface coating, water-borne coating, powder coating, paint, printing ink, security printing ink, plastic article, concrete, cosmetic composition, agricultural sheeting, tarpaulin, laser marking on a paper or plastic article, pigment composition or dry preparation, comprising surface-modified effect pigments according to claim 1.

10. A method for light protection or corrosion protection comprising applying surface-modified effect pigments according to claim 1 to an article that is to be protected from light or corrosion.

11. Surface-modified effect pigments based on flake-form substrates, which are sheathed with one or more layers of immobilised UCST polymer, wherein said surface-modified effect pigments based on flake-form substrates are holographic pigments, pearlescent pigments, interference pigments, multilayered pigments, metal-effect pigments, goniochromatic pigments and/or BiOCl pigments, which surface-modified effect pigments are prepared by applying the UCST polymer to the pigment surface by precipitation by controlling the temperature in water and/or in an organic solvent followed by irreversibly immobilizing the UCST polymer on the surface of the pigment.

12. Surface-modified effect pigments according to claim 11, where the immobilization of the UCST polymer on the surface of the pigment is achieved by the cross-linking of the polymer.

13. Surface-modified effect pigments based on flake-form substrates, which are sheathed with one or more layers of immobilized UCST polymer such that the UCST polymer does not form a chemical bond with the effect pigments, wherein said surface-modified effect pigments based on flake-form substrates are holographic pigments, pearlescent pigments, interference pigments, multilayered pigments, metal-effect pigments, goniochromatic pigments and/or BiOCl pigments.

14. Surface-modified effect pigments based on flake-form substrates,
which are sheathed with one or more layers of immobilised UCST polymer,
wherein the UCST polymer is a polystyrene, polystyrene copolymer or polyethylene oxide copolymer, or a mixture thereof,
wherein said surface-modified effect pigments based on flake-form substrates are holographic pigments, pearlescent pigments, interference pigments, multilayered pigments, metal-effect pigments, goniochromatic pigments and/or BiOCl pigments,
which surface-modified effect pigments are prepared by applying the UCST polymer to the surface of the effect pigments by precipitation in water and/or an organic solvent, and
irreversibly immobilizing said UCST polymer on the surface of the effect pigments.

15. Surface-modified effect pigments according to claim 14, where the immobilization of the UCST polymer on the surface of the pigment is achieved by the cross-linking of the polymer.

16. Surface-modified effect pigments according to claim 14, wherein the polymer sheath additionally comprises one or more nanoparticles, polymerizable monomers, plasticizers, antioxidants, carbon-black particles, microtitanium or a mixture thereof.

17. Surface-modified effect pigments according to claim 14, wherein the polymer sheath comprises 0.001 to 150% by weight of one or more additives, based on the polymer.

18. Surface-modified effect pigments according to claim 14, wherein the effect pigments are based on natural or synthetic mica, $Al_2O_3$ flakes, $TiO_2$ flakes, $SiO_2$ flakes, $Fe_2O_3$ flakes, glass flakes, ceramic flakes or graphite flakes.

19. A surface coating, water-borne coating, powder coating, paint, printing ink, security printing ink, plastic article, concrete, cosmetic composition, agricultural sheeting, tarpaulin, laser marking on a paper or plastic article, pigment composition or dry preparation, comprising surface-modified effect pigments according to claim 14.

20. A method for light protection or corrosion protection comprising applying surface-modified effect pigments according to claim 14 to an article that is to be protected from light or corrosion.

* * * * *